(12) United States Patent
Jones et al.

(10) Patent No.: US 6,458,466 B1
(45) Date of Patent: *Oct. 1, 2002

(54) BRAKE OR CLUTCH COMPONENTS HAVING A CERAMIC-METAL COMPOSITE FRICTION MATERIAL

(75) Inventors: Bart R. Jones; Arthur R. Prunier, Jr.; Aleksander J. Pyzik, all of Midland, MI (US)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/402,988

(22) PCT Filed: Apr. 24, 1998

(86) PCT No.: PCT/US98/08297

§ 371 (c)(1),
(2), (4) Date: Jan. 11, 2000

(87) PCT Pub. No.: WO98/50712

PCT Pub. Date: Nov. 12, 1998

(51) Int. Cl.[7] ................................................. B32B 15/04
(52) U.S. Cl. ............... 428/469; 188/218 R; 188/250 R; 192/107 M; 192/107 R; 192/12 R; 192/30 R
(58) Field of Search ................................. 428/469, 472, 428/472.2, 698, 908.8, 704; 188/218 R, 250 R, 251 M; 192/107 M, 107 R, 12 R, 30 R

(56) References Cited

U.S. PATENT DOCUMENTS

| | | | |
|---|---|---|---|
| 3,864,154 A | | 2/1975 | Gazza et al. |
| 4,067,743 A | | 1/1978 | Arabei et al. |
| 4,104,062 A | | 8/1978 | Weaver |
| 4,290,510 A | | 9/1981 | Warren |
| 4,605,440 A | | 8/1986 | Halverson et al. |
| 4,702,770 A | | 10/1987 | Pyzik et al. |
| 4,718,941 A | | 1/1988 | Halverson et al. |
| 4,834,938 A | | 5/1989 | Pyzik et al. |
| 4,969,251 A | * | 11/1990 | Burkhart, III et al. ..... 29/527.4 |
| 5,028,494 A | | 7/1991 | Tsujimura et al. |
| 5,039,633 A | * | 8/1991 | Pyzik et al. .................. 501/93 |
| 5,056,630 A | | 10/1991 | Fuji et al. |
| 5,224,572 A | | 7/1993 | Smolen, Jr. et al. |
| 5,298,468 A | * | 3/1994 | Pyzik et al. .................. 501/87 |
| 5,325,941 A | | 7/1994 | Farinacci et al. |
| 5,394,929 A | * | 3/1995 | Pyzik et al. .................. 164/97 |
| 5,501,306 A | | 3/1996 | Martino |
| 5,508,120 A | | 4/1996 | Pyzik et al. |
| 5,614,308 A | * | 3/1997 | Claar ...................... 428/312.6 |
| 5,620,791 A | | 4/1997 | Dwivedi et al. |
| 5,629,101 A | | 5/1997 | Watremez |
| 5,672,435 A | | 9/1997 | Born et al. |
| 5,712,029 A | | 1/1998 | Tsugawa et al. |
| 5,957,251 A | * | 9/1999 | Jones et al. ................. 188/251 |
| 5,980,602 A | * | 11/1999 | Carden ........................ 75/236 |

FOREIGN PATENT DOCUMENTS

| | | | |
|---|---|---|---|
| WO | WO-97/41368 A | * | 11/1997 |
| WO | WO-97/43228 A | * | 11/1997 |

OTHER PUBLICATIONS

Chemical Abstracts, 91–105979/15, "Prodn. Of aluminum composite material for brake disc." JO 3047–945A (Feb. 1991).

Chemical Abstracts, 35455X/19, "Sintered titanium–based friction material," SU–473–758 (Oct. 1975).

Chemical Abstracts, 87/287609/41, "Anti–abrasion braking material," J6 2200–042–A (Sep. 1987).

* cited by examiner

Primary Examiner—Deborah Jones
Assistant Examiner—Gwendolyn Blackwell-Rudasill

(57) ABSTRACT

A braking component such as a brake pad, brake rotor, brake drum or clutch disk is comprised of a metal substrate having a friction material laminated on at least a portion of at least one face of the metal substrate, the friction material being a ceramic-metal composite comprised of a metal phase and a ceramic phase dispersed within each other, wherein the ceramic phase is present in an amount of at least about 20 percent by volume of the ceramic-metal composite. In particular, the braking component is a metal substrate, such as aluminum, having laminated thereto a ceramic-metal composite of a dense boron carbide-aluminum composite having high specific heat and low density.

23 Claims, No Drawings

BRAKE OR CLUTCH COMPONENTS HAVING A CERAMIC-METAL COMPOSITE FRICTION MATERIAL

The present invention relates to a brake or clutch component where at least a portion of the component is a ceramic-metal composite.

Generally, in an automotive disk brake, the brake rotor is attached to the car by an axle. As the car travels, the brake rotor rotates with the wheel of the car. The brake caliper assembly contains the brake piston and brake pads and is rigidly mounted to the car frame. Upon application of the brake pedal, hydraulic fluid drives the brake piston or pistons outward from the cylinders in the caliper assembly forcing the brake pads to engage the rotor causing the frictional braking force that stops the car from traveling.

Since the discovery of the toxic effects of asbestos, brakes for light duty vehicles, such as pickup trucks and cars, have been made from cast iron rotors or drums engaged by brake pads or shoes having semi-metallic or non-asbestos organic composite pads. These brakes have suffered from problems such as noise, shudder, vibration and short lifetimes of the pads, rotors and drums. Drums and rotors have also tended to warp due to greater heat generation as a result of the use of semi-metallic brake pads. A consequence of this has been excessive warranty costs to automobile manufacturers, which has been estimated to be about $85 per car in North America.

In addition, since the present pads or shoes wear out quickly, the hydraulic brake piston that forces the pad into contact with the rotor or drum has needed to have a long travel to compensate for the wearing out of the brake pad or shoe (that is, the pad has to be thicker to compensate for the faster wear rate). The long travel necessitates the use of a larger caliper assembly and larger piston, which adds weight to the brake. The excessive wear of today's brake pads also cause aesthetic problems, such as brake pad dust on the wheels.

More recent alternative brakes, such as carbon/carbon composite brakes, have only been used, due to cost and design considerations, on the most exotic applications (for example, race cars and military aircraft).

Therefore, it would be desirable to provide a brake that is lighter, avoids the short lifetime, dusting and repair costs associated with today's light duty vehicle brakes at a cost competitive with current metal brakes.

A first aspect of this invention is a braking component comprised of a metal substrate that has a friction material laminated onto at least a portion of one face of the metal substrate, wherein the friction material is a ceramic-metal composite comprised of a metal phase and a ceramic phase, the ceramic phase being present in an amount of at least 20 percent by volume of the composite. Another aspect of this invention is a brake having at least one braking component of the first aspect of this invention. A third aspect of this invention is a clutch having at least one braking component of the first aspect of this invention.

The braking component of the present invention may be used as a brake component, such as a brake rotor, brake drum, brake shoe and brake pad. The braking component may also be used as a clutch disk or flywheel. Examples of clutches include automotive drivetrain clutches, air conditioner clutches and compressor clutches in refrigerators. The braking components of this invention may be made with lighter metals having lower melting temperatures than metals currently used in brakes. The braking component consequently allows light duty vehicle brakes to be less massive. In addition, the use of the braking components generally provide reduced wear compared to current brakes, consequently, brakes made from these components can be smaller while providing the same lifetimes as current brakes. Similar enhancements result for clutches.

The Braking Component

The braking component may be any component that generates a braking or frictional force when contacted with an opposing component. In particular, the braking component is a component that contacts an opposing component moving relative to the braking component such that the relative motion of the two components is arrested. Examples of the braking component include brake pads, brake shoes, brake rotors, brake drums, clutch disks, flywheels and centrifugal chucks.

The braking component is comprised of a metal substrate having a friction material laminated to at least a portion of one face. In general, the metal substrate supports the friction material and provides the shape of the braking component and points of attachment of the braking component to a greater mechanism, such as a brake, transmission or car. The metal substrate, when attached to a greater mechanism, transfers the frictional force generated by the friction material to the greater mechanism, for example, to stop a car.

The metal substrate may be any known or conventional metal used in the manufacture of brakes, clutches or structural metal components. Examples of metals include ferrous metals (for example, steels and cast iron), aluminum, aluminum alloys, titanium, titanium alloys, magnesium and magnesium alloys. Preferably the metal of the metal substrate is a ferrous metal, aluminum or aluminum alloy. More preferably the metal is aluminum or alloy thereof.

The friction material is laminated to at least a portion of a face of the metal substrate such that, under normal operating conditions, the friction material is the only part of the braking component that contacts an opposing component to provide the frictional force. For example, when the braking component is a brake rotor, the friction material is laminated to the braking face of a metal rotor (that is, metal substrate) where the braking face of the rotor is the area contacted and swept by a brake pad upon braking. The friction material may be laminated to the metal substrate in segments or continuously. That is to say, there may be gaps between the CMC laminated to the metal substrate as long as the friction material is the only part that contacts, under normal operation, an opposing component to generate the frictional force. An illustrative example is a brake rotor that has pads of friction material that are uniformly distributed around and laminated on the braking face of the metal brake rotor. Generally, the friction material covers from 10 percent to 100 percent of any particular face.

The frictional material may be any thickness depending on, for example, the particular braking component (for example, truck brake versus car brake), desired lifetime of the component and severity of the environment the braking component may operate in. Generally, the thickness of the braking component is from 0.5 to 20 mm. Preferably, the thickness is from 1 to 10 mm.

The Ceramic-Metal Composite (CMC)

The friction material is a ceramic-metal composite (CMC) that is comprised of a ceramic phase and a metal phase dispersed within each other. Herein, the CMC is understood to contain essentially no resinous binder (for example, phenol-formaldehyde resins), except that which may penetrate open pores of the CMC when it is glued to the metal substrate using an adhesive described under "Preparing the Braking Component." Otherwise, essentially no resinous binder is an amount corresponding to at most a trace amount in the body of the CMC.

The metal phase of the CMC may be a metal selected from the Periodic Table Groups 2, 4–11, 13 and 14 and alloys thereof. Said groups conform to the new IUPAC notation, as described on pages 1–10 of the *CRC Handbook of Chemistry and Physics* 71*st* Ed., 1990–91. Preferred metals include silicon, magnesium, aluminum, titanium, vanadium, chromium, iron, copper, nickel, cobalt, tantalum, tungsten, molybdenum, zirconium, niobium or mixtures and alloys thereof. More preferred metals are aluminum, silicon, titanium and magnesium or mixtures and alloys thereof. Most preferably the metal is aluminum and alloys of aluminum, such as those that contain one or more of Cu, Mg, Si, Mn, Cr and Zn. Exemplary aluminum alloys include Al—Cu, Al—Mg, Al—Si, Al—Mn—Mg and Al—Cu—Mg—Cr—Zn. Specific examples of aluminum alloys include 6061 alloy, 7075 alloy and 1350 alloy, each available from the Aluminum Company of America, Pittsburgh, Pa.

The ceramic phase of the CMC may be a boride, oxide, carbide, nitride, silicide or combination thereof. Combinations include, for example, borocarbides, oxynitrides, oxycarbides and carbonitrides. Generally, at least about 45 volume percent of the ceramic phase has a melting or decomposition temperature of at least about 1400° C. Preferably at least about 60 percent, more preferably at least about 80 percent and most preferably at least about 90 percent by volume of the ceramic phase has a melting or decomposition temperature of at least about 1400° C. Preferred ceramics include SiC, $B_4C$, $Si_3N_4$, $Al_2O_3$, $TiB_2$, $SiB_6$, $SiB_4$, AlN, ZrC, ZrB, a reaction product of at least two of said ceramics or a reaction product of at least one of said ceramics and the metal of the CMC. The most preferred ceramic is boron carbide.

Examples of a ceramic-metal composite include $B_4C$/Al, SiC/Al, AlN/Al, $TiB_2$/Al, $Al_2O_3$/Al, $SiB_x$/Al, $Si_3N_4$/Al, SiC/Mg, SiC/Ti, SiC/Mg—Al, $SiB_x$/Ti, $B_4C$/Ni, $B_4C$/Ti, $B_4C$/Cu, $Al_2O_3$/Mg, $Al_2O_3$/Ti, TiN/Al, TiC/Al, $ZrB_2$/Al, ZrC/Al, $AlB_{12}$/Al, $AlB_2$/Al, $AlB_{24}C_4$/Al, $AlB_{12}$/Ti, $AlB_{24}C_4$/Ti, TiN/Ti, TiC/Ti, $ZrO_2$/Ti, $TiB_2$/$B_4C$/Al, SiC/$TiB_2$/Al, TiC/Mo/Co, ZrC/ZrC/$ZrB_2$/Zr, $TiB_2$/Ni, $TiB_2$/Cu, TiC/Mo/Ni, SiC/Mo, $TiB_2$/TiC/Al, $TiB_2$/TiC/Ti, WC/Co and WC/Co/Ni. The subscript "x" represents varying silicon boride phases that can be formed within the part. More preferred combinations of a metal and ceramic include: $B_4C$/Al, SiC/Al, $SiB_6$/Al, $TiB_2$/Al and SiC/Mg. Most preferably, the CMC is comprised of a chemically reactive system, such as aluminum-boron carbide or aluminum alloy-boron carbide. In a chemically reactive system, the metal component can react with the ceramic during formation of the CMC resulting in a new ceramic phase being formed. Said new phase can modify properties, such as hardness and high temperature strength of the composite. A most preferred chemically reactive system is $B_4C$/Al, wherein the metal phase is aluminum or alloy thereof and the ceramic phase is comprised of at least two ceramics selected from the group consisting of $B_4C$, $AlB_2$, $Al_4BC$, $Al_3B_{48}C_2$, $AlB_{12}$ and $AlB_{24}C_4$.

To impart, for example, sufficient wear resistance, the ceramic phase of the CMC is at least about 20 percent by volume of the CMC. However, the amount of ceramic phase in the CMC should not be so great that, for example, it is difficult to bond the CMC to the metal substrate adequately. The ceramic phase is preferably present in an amount of at least about 50 percent, more preferably at least about 75 percent and most preferably at least about 85 percent by volume to preferably at most about 98 percent by volume of the CMC.

In a preferred embodiment of the CMC, the metal phase is non-contiguously dispersed within the ceramic phase and, consequently, the ceramic phase is interconnected. In this preferred embodiment, the metal phase is comprised of regions that preferably have an average equivalent diameter of at most about 30 microns, more preferably at most about 10 microns, and most preferably at most about 5 microns, and preferably at least about 0.25 micron, more preferably at least about 0.5 micron, and most preferably at least about 1 micron. Preferably the largest metal region is at most about 100 microns, more preferably at most 75 microns, and most preferably at most 50 microns in diameter. In addition, it is also preferred that the metal regions are predominantly equiaxed and predominantly situated at ceramic-ceramic grain triple points as opposed to elongated along ceramic grain boundaries, as determined by optical quantitative stereology from a polished sample described by K. J. Kurzydtowski and B. Ralph, *The Quantitative Description of the Microstructure of Materials*, CRC Press, Boca Raton, 1995.

The CMC may be porous as long as the CMC provides sufficient wear resistance, heat dissipation and strength during operation, for example, of a brake or a clutch. The porosity may advantageously vary cross the thickness of the CMC laminated to the metal substrate. For example, the face of the CMC laminated to the metal substrate may be more porous than the face that contacts an opposing component. The porosity may enhance the heat shielding of the metal substrate and also, may aid the bonding of the CMC to the substrate. Generally, the porosity, given by the percent of theoretical density of the CMC, is preferably at least about 90 percent, more preferably at least about 95 percent and most preferably at least about 98 percent of theoretical. Herein, the theoretical density is the theoretical density described on page 530 of *Introduction to Ceramics* $2^{nd}$ *Ed.*, W. D. Kingery et al., John Wiley and Sons, New York, 1976.

The CMC may have any density, so long as the CMC provides sufficient wear resistance, heat dissipation and strength under operating conditions, for example, of a clutch or brake. Since it is advantageous for a brake inter alia to be as light as possible, the CMC preferably has a density of at most about 6 g/cc, more preferably at most about 4 g/cc, and even more preferably at most about 3 g/cc to preferably at least about 0.5 g/cc, more preferably at least about 1.0 g/cc and most preferably at least about 1.5 g/cc.

The dynamic coefficient of friction of one component's CMC in contact with another component's CMC should provide a frictional force sufficient to operate, for example, a brake or clutch under operating conditions, but not so high that excessive wear or heat is generated. More specifically, the dynamic coefficient of friction of the CMC, in contact with another CMC in motion relative to each other, is desirably at least about 0.2. The dynamic coefficient of friction may be determined by a pin on disk method using a 1 pound load, as described by ASTM G-99 Standard and M. A. Moore, in "Wear of Materials," pp. 673–687, *Am. Soc. Eng.*, 1987. The CMC coefficient of friction is preferably at least about 0.3, even more preferably at least about 0.4, more preferably at least about 0.6 and most preferably at least about 0.8 to preferably at most about 5.

The wear resistance of the CMC against itself is desirably an amount sufficient to provide a greater lifetime (that is, greater wear resistance) than the CMC against cast iron. For example, it is preferred that the CMC has a wear diameter of less than about 5 mm, more preferably less than about 1.5 mm, and most preferably less than about 1 mm, as determined by the pin on disk method described in the previous paragraph.

The toughness of the CMC may be any toughness sufficient to avoid catastrophic failure of the CMC under operating conditions, for example, of a brake or clutch. Preferably the toughness is at least about 5.0 MPam$^{1/2}$. More preferably the CMC toughness is at least 5.5, even more preferably at least 6 and most preferably at least about 6.5 MPam$^{1/2}$ to preferably at most about 25 MPam$^{1/2}$, as determined by a Chevron Notch method described in "Chevron-Notched Specimens: Testing and Stress Analysis," STP 855, pp. 177–192, Ed. J. H. Underwood et al., *Amer. Soc. for Testing and Matl.*, Pa., 1984.

The thermal conductivity of the CMC should be great enough to dissipate the heat generated during operation, such that the CMC (particularly the CMC surface in contact with an opposing CMC surface) is not damaged by excessive heat. To dissipate the heat generated during operation (for example, braking), the CMC advantageously has a thermal conductivity of at least about 5 W/m-K, as determined by a laser flash method described in more detail by "Flash Method of Determining Thermal Diffusivity, Heat Capacity, and Thermal Conductivity," *Journal of Applied Physics*, W. J. Parker et al., 32, [9], pp. 1679–1684. More preferably the thermal conductivity is at least about 10, even more preferably at least about 20 and most preferably at least about 25 W/m-K. However, the thermal conductivity should not be so great that the metal substrate is damaged due to excessive heat. For example, it is desirable that the CMC has a thermal conductivity less than about 150 W/m-K.

The CMC should also have a specific heat such that the temperature reached during contact with an opposing component is less than a temperature sufficient to damage either the CMC, metal substrate or other metal components that make up a larger mechanism, such as a brake or clutch. Preferably the specific heat is at least about 0.4 J/g° C., at room temperature as determined by differential scanning calorimetry. More preferably the specific heat is at least about 0.6, even more preferably at least about 0.8 J/g° C., and most preferably at least about 1 J/g° C. to preferably at most the maximum theoretically possible for a selected CMC. The specific heat also desirably increases as the temperature increases. For example, the specific heat at 1000° C. is desirably at least double the specific heat at room temperature.

The flexure strength of the CMC may be any strength sufficient to avoid fracture of the CMC under operating conditions. For example, the strength of the CMC, at about room temperature, should be at least about 150 MPa as determined by ASTM C1161. Preferably the strength is at least about 200 MPa, more preferably at least about 300 MPa, and most preferably at least about 400 MPa to preferably at most about 1500 MPa. It is more preferred that the CMC have the above strengths at about 500° C., even more preferably at about 700° C. and most preferably about 900° C.

THE CLUTCH AND BRAKE

The brake or clutch of this invention has at least one braking component according to the first aspect of this invention. An illustrative example of a brake having at least one braking component is a disk brake where either the brake rotor or brake pad is a braking component of this invention. More preferably each component of the brake or clutch that provides a frictional force for arresting motion is a braking component of the first aspect of this invention. Even more preferably, each of these braking components has a friction material that is the same material (that is, the friction material in each braking component is the same ceramic-metal composite). An illustrative example is a disk brake having an aluminum alloy brake rotor that has aluminum-boron carbide composite friction material laminated on the braking faces of the rotor and brake pads that have an aluminum alloy substrate, with aluminum-boron carbide friction material laminated thereto.

Preparing The Metal Substrate

The metal substrate may be made by a convenient or a known method, such as casting, forging, extrusion, rolling, powder metallurgy, single point machining, fixed abrasive grinding, free abrasive grind, polishing, or combination thereof. These techniques are described in *Manufacturing Engineering and Technology* 2nd Ed., S. Kalpakjian, Addison-Wesley Publishing Co., New York, 1992. Illustratively, the forming of the metal substrate may be a metal brake rotor fabricated by a known or convenient metal forming method, such as casting, followed by machining, wherein the CMC, described previously, is bonded to the metal rotor.

Preparing the Ceramic-Metal Composite (CMC)

The CMC portion of the brake component may be made by any convenient or known powdered metal or ceramic processing technique, wherein a shaped body is formed followed by a consolidation technique(s) and, if desired, finishing the article to final shape. Two typical consolidation routes which may be used to form the CMC of this invention are (1) infiltrating a porous ceramic particulate body (greenware) with metal and (2) densifying a porous particulate body (greenware) containing metal and ceramic particulates. The infiltrated or densified body may then be finished (that is, machined) by techniques, such as diamond grinding, laser machining and electro-discharge machining. Said body may also be heat treated to alter the microstructure of the consolidated composite. Preferably the composite is made by infiltration.

The ceramic or metal powder of the CMC, typically, has an average particle size by weight of at most about 50 micrometers, preferably at most about 15 micrometers, more preferably at most 10 microns and most preferably at most 5 microns. The particles may be in the shape of platelets, rods or equiaxed grains. The particles of the ceramic powder desirably have a particle diameter within a range of 0.1 to 10 micrometers.

Suitable shaping methods to form greenware (that is, a porous body made up of particulates) for infiltrating or densifying include known methods, such as slip or pressure casting, pressing and plastic forming methods (for example, jiggering and extrusion). The shaping methods may include steps, such as mixing of components, such as ceramic powder, metal powder, dispersants, binders and solvent and removing, if necessary, solvent and organic additives, such as dispersants and binders, after shaping of the greenware. Each of the above methods and steps are described in more detail in *Introduction to the Principles of Ceramic Processing*, J. Reed, J. Wiley and Sons, N.Y., 1988, incorporated herein by reference.

The metal-ceramic particulate greenware may be densified into the CMC by techniques, such as vacuum sintering, atmospheric pressure (pressureless) sintering, pressure assisted sintering, such as hot pressing, hot isostatic pressing and rapid omnidirectional compaction and combinations thereof, each pressure assisted technique is further described in *Annu. Rev. Mater. Sci.*, 1989, [19], C. A. Kelto, E. E. Timm and A. J. Pyzik, pp. 527–550, incorporated herein by reference.

The metal-ceramic particulate greenware is densified under conditions of time, atmosphere, temperature and pressure sufficient to density the greenware to the CMC having a desired density, which is, generally, at least about 90 percent of theoretical density. The temperature is, typically, greater than about 75 percent of the melt temperature in degrees C of the metal but less than a temperature where substantial volatilization of the metal occurs. For example, the densification temperature for an aluminum-boron carbide system is preferably between 500° C. to 1350° C. The time is desirably as short as possible. Preferably the time is at most about 24 hours, more preferably at most about 2 hours and most preferably at most about 1 hour. The pressure is desirably ambient at atmospheric pressure. The atmosphere is desirably one that does not adversely affect the densification or chemistry of the CMC.

Preferably the CMC is produced by infiltrating a porous ceramic body with a metal, thus forming a composite. Ceramic-metal combinations which may be suitable for infiltration have been described previously. The infiltrated body may be further consolidated by techniques described hereinabove. More preferably the ceramic of the metal infiltrated ceramic also reacts with the metal, thus forming a new ceramic phase in the dense composite (that is, chemically reactive system). A preferred embodiment of a chemically reactive system is the infiltration of boron carbide with aluminum or alloy thereof, as described below, and in U.S. Pat. Nos. 5,508,120; 5,521,016; and 5,394,929.

Infiltration involves forming a porous ceramic preform (that is, greenware) prepared from ceramic powder by a procedure described previously, such as slip casting (that is, a dispersion of the ceramic powder in a liquid) or pressing (that is, applying pressure to powder in the absence of heat) and then infiltrating a liquid metal into the pores of the preform. Infiltration is the process in which a liquid metal fills the pores of preform in contact with the metal. The process preferably forms a uniformly dispersed and essentially fully dense (that is, density of at least about 98 percent of theoretical) ceramic-metal composite. Infiltration of the porous preform may be performed by any convenient method for infiltrating a metal into a preform body, such as vacuum infiltration, pressure infiltration and gravity/heat infiltration. Examples of infiltration are described by U.S. Pat. Nos. 4,702,770 and 4,834,938.

The temperature of infiltration is dependent on the metal to be infiltrated. Infiltration is preferably performed at a temperature where the metal is molten but below a temperature at which the metal rapidly volatilizes. For example, when infiltrating aluminum or an alloy thereof into a porous ceramic preform, the temperature is preferably at most about 1200° C., and more preferably at most about 1100° C., and preferably at least about 750° C. and more preferably at least about 900° C. The infiltration time can be any time sufficient to infiltrate the ceramic preform resulting in a desired CMC. The atmosphere can be any atmosphere which does not adversely affect the infiltration of metal or development of the CMC.

The preform may contain, in the case of chemically reactive systems, a ceramic filler material in an amount from 0.1 to 50 weight percent, based upon total preform weight. Filler is material which has no, or a significantly lower, reactivity with the infiltrating metal than a chemically reactive ceramic, such as boron carbide, in the boron carbide-aluminum system. For example, when a boron carbide preform contains filler, the preform preferably contains from 70 to 95 weight. percent $B_4C$ and from 5 to 30 weight. percent ceramic filler. The percentages are based upon total preform weight. For example, in the boron carbide-aluminum system, the ceramic filler material can be titanium diboride, titanium carbide, silicon boride, aluminum oxide and silicon carbide.

When making, by infiltration, the most preferred CMC (boron carbide-aluminum system), the porous boron carbide preform is desirably baked at a temperature of at least 1400° C. prior to infiltration. Baking should continue for at least 15 minutes, desirably at least 30 minutes and preferably two hours or more.

The baked porous boron carbide preform is then infiltrated with aluminum or alloy thereof by a convenient method described previously.

The CMCs may be subjected to an additional (post-infiltration) heat treatment to improve their strength. As illustration, the boron carbide-aluminum infiltrated composite is heat-treated at a temperature within a range of from 660° C. to 1250° C., preferably from 660° C. to 1100° C., and more preferably from 800° C. to 950° C., in the presence of air or some other oxygen-containing atmosphere, for a time sufficient to allow slow reactions between residual unreacted metal and $B_4C$ or B—Al—C reaction products or both. The reactions promote reduction of free (unreacted) metal and development of a uniform microstructure.

The post-infiltration heat treatment has a duration that, typically, ranges from 1 to 100 hours, desirably from 10 to 75 hours and preferably from 25 to 75 hours. A duration in excess of 100 hours increases production costs but yields no substantial additional improvements in microstructure over those occurring at 100 hours.

When a ceramic filler material is present in the boron carbide-aluminum CMC, the filler, typically, is present in the CMC either as isolated grains or as part of the clusters of $B_4C$ grains. The amount of ceramic filler material, typically, is between 1 to 25 volume percent, based upon total composite volume.

Preparing the Braking Component

The CMC may be laminated to the metal substrate by any convenient method sufficient to adhere the CMC to the metal, such that the CMC stays laminated to the substrate during operation. Exemplary methods include brazing, welding, riveting and direct diffusional bonding. The CMC may be laminated to the metal substrate by contacting the metal substrate with the CMC and, subsequently, heating the contacted substrate and CMC to a temperature sufficient to bond the CMC to the metal substrate.

The CMC may also be laminated by using an adhesive to bond the CMC to the metal substrate. Suitable adhesives include those known in the art, such as adhesives described in *Adhesives Technology Handbook*, Arther H. Landrock, Noyes Publications, Park Ridge, N.J., à 1985. Preferably the adhesive is a thermoset adhesive that is thermally cured. Examples of preferred adhesives include phenolic, polyimide, polysulfide and epoxy resins having sufficient thermal stability to withstand the operating temperatures, for example, of a brake, according to this invention. Hybrids of the preferred adhesives, such as nitrile-phenolic, neoprene-phenolic, nitrile-epoxy, nylon-epoxy and sulfide-epoxy are also preferred. The adhesive may be any form useful in laminating the CMC to the metal substrate, such as a liquid, paste, film or powder. The adhesive may be utilized by a suitable method, such as those known in the art, to glue two parts together. An illustrative method is as follows: (1) applying a solvent or water-based adhesive formulation to a surface of the CMC and metal substrate, (2) baking the CMC and metal substrate under conditions that remove the solvent of the applied adhesive formulation, (3) contacting the CMC and metal substrate and (4) baking the contacted CMC and substrate under more severe conditions (for example, higher temperature) than step 2, such that the adhesive present on the CMC and on the substrate bond (for example, crosslink), thereby adhering the CMC to the substrate.

Before laminating the CMC to the metal substrate, the metal substrate and CMC may be treated to enhance the strength of the bond between them. Exemplary treatments include solvent cleaning, emulsion cleaning, alkaline cleaning, acid cleaning pickling, salt bath descaling ultrasonic cleaning, roughening (for example, abrasive blasting, barrel finishing, polishing and buffing, chemical etching and electro-etching), as described in Chapter 7 of *Handbook of Tribology, Materials, Coating and Surface Treatments*, B. Bhushan and B. K. Gupta, Mcgraw Hill, Inc., New York, 1991.

An interlayer may be applied to the CMC, metal substrate or both before laminating. The interlayer increases the strength or adhesion of the bond of the CMC to the metal substrate compared to a bond formed in the absence of the interlayer. The interlayer preferably is a material (herein interlayer material) that alloys or reacts to form a separate phase individually with one or more element, metal and compound of the metal substrate and CMC being laminated. Preferably the interlayer material is a metal. This metal may be the metals that have been described previously for the metal of the CMC and metal substrate. A particularly preferred embodiment is when the CMC is the aluminum boron carbide system bonded to a cast iron metal substrate.

The interlayer may be any thickness sufficient to enhance the adhesion of the CMC to the metal substrate but, in general, the interlayer is at most about 10 percent of the thickness the CMC being laminated. Illustratively, the interlayer is, typically, between 0.1 to 100 micrometers thick.

The interlayer may be applied to the metal substrate or CMC to be laminated by a technique selected from: plasma spraying; sputtering; physical vapor deposition; chemical vapor deposition; electroless plating; electroplating and combination thereof. Each of these techniques is described in greater detail in *Handbook of Tribology, Materials, Coating and Surface Treatments*, B. Bhushan and B. K. Gupta, McGraw Hill, Inc., New York, 1991.

When laminating the CMC to the metal substrate by heating (that is, diffusional bonding), the heating may be to any temperature sufficient to adequately adhere the CMC. However, the temperature should not be so great to cause fracture or deformation of the metal substrate or CMC being laminated, nor should the temperature exceed a temperature where a molten material is formed. Preferably the heating temperature, in degrees C., is at least about 50 percent to at most about 98 percent of the lowest temperature where a compound or metal present in the CMC or metal substrate would begin to melt or decompose. More preferably the heating temperature is at least about 75 percent to at most about 95 percent of the temperature just described.

The time at temperature when laminating, by heating, the CMC to the metal substrate is dependent on the metal substrate, CMC being laminated and temperature and pressure used to bond the CMC to the metal substrate. The time may be any time sufficient to adequately adhere or bond the CMC to the metal substrate. The time is preferably as short as practicable. Typical times range from a few minutes to several hours. The time is preferably at least about 10 seconds, more preferably at least about 2 minutes, even more preferably at least about 5 minutes, most preferably at least 10 minutes to at most about 10 hours, more preferably at most about 5 hours, even more preferably at most about 2 hours and most preferably at most about 1 hour.

When laminating the CMC to the metal substrate by heating, it is preferred that during heating a pressure is applied. The pressure may be any pressure that facilitates the adhesion of the CMC to the metal to a pressure that fails to cause deformation or fracture of either the metal substrate or CMC being laminated. It is preferred that the pressure is perpendicular and uniformly provided over the entire face of each CMC in contact with the metal substrate, such that each CMC is adhered uniformly to the metal substrate. Generally, the pressure may range from 0.1 psi to 250,000 psi. The pressure preferably is at most about 1000 psi, more preferably at most about 100 psi, even more preferably, the pressure is at most about 10 psi, and most preferably at most about 5 psi.

During laminating, the environment should be substantially inert to the metal substrate and CMC being laminated thereto. A substantially inert environment is one that fails to react with the metal substrate and CMC being laminated to an extent that causes, for example, the metal to inadequately adhere to the metal substrate. Of course, the metal substrate and CMC may react to form a compound which facilitates the adhesion of the CMC to the metal substrate, such as reactions that form a separate phase individually between one or more element, metal and compound of the metal substrate, interlayer and CMC being laminated. Environments during cladding may include gases and solids. Examples of useful gases include noble gases and nitrogen. Suitable solids include solids that fail to react with the metal substrate and the CMC being laminated, such as boron nitride. Laminating of the CMC to the metal substrate may also be conducted under vacuum.

What is claimed is:

1. A braking component for providing a frictional force comprised of a metal substrate having a friction material laminated onto at least a portion of a face of the metal substrate, the friction material being a ceramic-metal composite comprised of a metal phase and a ceramic phase dispersed within each other, wherein the ceramic phase is present in an amount of at least 20 percent by volume of the ceramic-metal composite and said ceramic phase is comprised of at least two ceramics selected from:
   (a) $B_4C$,
   (b) $AlB_2$,
   (c) $Al_4BC$,
   (d) $Al_3B_{48}C_2$,
   (e) $AlB_{12}$ and
   (f) $AlB_{24}C_4$.

2. The braking component of claim 1, wherein the amount of ceramic phase is at least 50 percent by volume of the composite.

3. The braking component of claim 2, wherein the amount of the ceramic phase is at least 85 percent to at most 98 percent by volume of the ceramic-metal composite.

4. The braking component of claim 1, wherein the metal phase of the ceramic-metal composite contains at least one metal selected from the group consisting of aluminum, zirconium, titanium, copper, silicon, magnesium and alloys thereof.

5. The braking component of claim 3, wherein the metal phase of the ceramic-metal composite is present as isolated metal regions having an average equivalent diameter between 0.25 to 30 micrometers.

6. The braking component of claim 1, wherein the braking component is a brake rotor, brake drum, brake pad, brake shoe, clutch disk or flywheel.

7. The braking component of claim 1, wherein the metal substrate is a metal selected from iron, iron alloys, aluminum, aluminum alloys, titanium, titanium alloys, magnesium, magnesium alloys and combinations thereof.

8. The braking component of any one of the preceding claims, wherein the metal substrate is aluminum or alloy thereof.

9. A brake having at least one braking component of claim 1.

10. The brake of claim 9, wherein each component of the brake that provides a frictional force for arresting motion is the braking component of claim 1.

11. The brake of claim 9, wherein the metal substrate is aluminum, aluminum alloy, iron or iron alloy.

12. A clutch having at least one braking component of claim 1.

13. The clutch of claim 12, wherein each component of the clutch that provides a frictional force for arresting motion is the braking component of claim 1.

14. The clutch of claim 12, wherein the metal substrate is aluminum, aluminum alloy, iron or iron alloy.

15. A braking component for providing a frictional force comprised of a metal substrate having a friction material laminated onto at least a portion of a face of the metal substrate, the friction material being a ceramic-metal composite comprised of a metal phase and a ceramic phase dispersed within each other, wherein the ceramic phase is present in an amount of at least 20 percent by volume of the ceramic-metal composite and interposed between the friction material and metal substrate is an interlayer that bonds the friction material to the metal substrate.

16. The braking component of claim 15, wherein the interlayer is an adhesive selected from the group consisting of a phenolic, polyimide, polysulfide, epoxy resin and combinations thereof.

17. The braking component of claim 15, wherein the interlayer is a metal.

18. The braking component of claim 17, wherein the metal of the interlayer alloys or reacts to form a separate phase individually with one or more element, metal and compound of the metal substrate and ceramic-metal composite.

19. The braking component of claim 17, wherein the interlayer is aluminum; zirconium; titanium; copper; silicon; magnesium or alloys thereof.

20. The braking component of claim 15, wherein the ceramic phase is a ceramic selected from the group consisting of: a boride, oxide, carbide, nitride, silicide and combination thereof.

21. The braking component of claim 15, wherein the ceramic-metal composite contains a metal phase that is aluminum, or an alloy thereof, and the ceramic phase is comprised of at least two ceramics selected from:

(a) $B_4C$,
(b) $AlB_2$,
(c) $Al_4BC$,
(d) $Al_3B_{48}C_2$,
(e) $AlB_{12}$ and
(f) $AlB_{24}C_4$.

22. A clutch having at least one braking component of claim 15.

23. A brake having at least one braking component of claim 15.

* * * * *